Dec. 7, 1948.  E. G. THEURER  2,455,885

SCREW FASTENING

Filed Oct. 1, 1945

INVENTOR
Erich G. Theurer
BY
ATTORNEYS

Patented Dec. 7, 1948

2,455,885

UNITED STATES PATENT OFFICE 2,455,885

SCREW FASTENING

Erich G. Theurer, Teaneck, N. J.

Application October 1, 1945, Serial No. 619,606

4 Claims. (Cl. 85—32)

1

The present invention is concerned with means for securely affixing screws into structures of machinable material, such as plastic, wood, aluminum castings, magnesium castings and die castings generally, of shearing strength insufficient to admit of threading a machine screw or a self-tapping screw directly thereinto.

It is among the objects of the invention to provide a simple and inexpensive insert, which dispenses with the need for tapping the bore of the mounting structure before application of the insert, which admits of being embedded completely within the thickness of the mounting structure without protruding parts, which in the application thereof imposes no undue strain upon the plastic or other mounting structure, yet affords an inherently secure mount, though no lock ring, nut or other auxiliary holding appliance is used, a mount the security of which is further enhanced by the application of the screw to be positioned in the insert, which screw inherently becomes securely, yet removably locked in place in the insert without the need for lock washer or other extraneous screw-locking instrumentalities.

Figure 1:
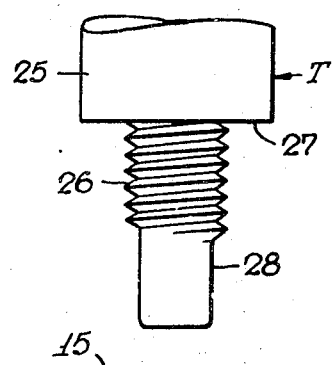
Figure 2:
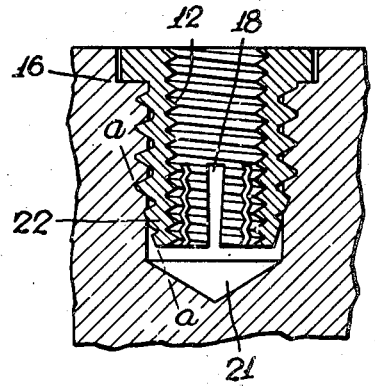
Figure 3:
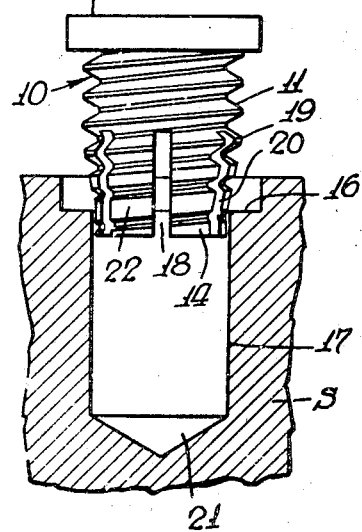
Figure 3:
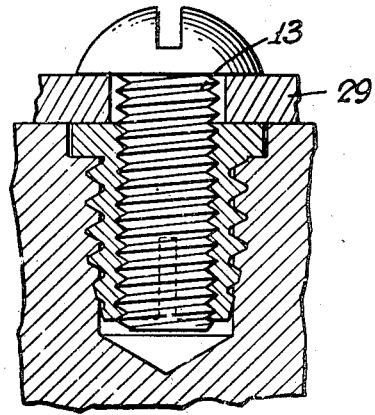
Figure 4:
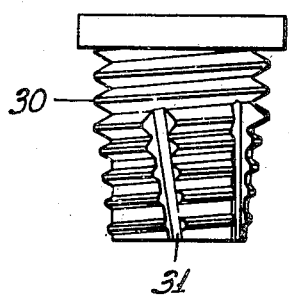

In the accompanying drawings in which are shown one or more of various possible embodiments of the several features of the invention, Fig. 1 is a side elevation partly in cross-section showing one embodiment preparatory to introducing the insert into the mounting structure, Fig. 2 is a view in longitudinal cross-section showing the insert (in this case devoid of the cylindrical pilot), in place in the mounting structure, Fig. 3 is a view similar to Fig. 2 showing the relation of the parts with the mounting screw in place therein, and Fig. 4 is a side elevation of a modified form of insert.

Referring now to the drawings, the insert is a screw 10 having an external machine screw thread 11 and an axial bore tapped at 12 and serving for mounting the screw 13 to be retained therein. While the external thread has been shown and in many applications is preferred of coarser pitch than the internal thread, it will be understood that the relationship may be reversed, or the threads may be of equal pitch.

Desirably the insert is tapered as by machining off the crowns of the threads at the entry end thereof along a conical locus as at a—a. If desired, the reduced end of the insert may have a short cylindrical pilot extension 14, as shown in Fig. 1, but omitted from Figs. 2, 3 and 4. Desirably, the insert is provided with a head 15 to be

2 disposed in a countersink 16 about the bore 17 in the mounting structure S.

In a preferred embodiment, the entry part of the hollow screw is longitudinally slotted as at 18, thereby to provide sharp cutting edges 19 along the trailing flanks of the several slots 18. The cutting edges near the inner part of the insert are mutilated triangles or trapezia 20, while those at the closed ends of slots 18 are complete triangles.

Thus the insert comprises an internally and externally threaded tube of metal with interruptions, preferably slots, extending longitudinally from one end thereof, the sides of such interruptions or slots determining cutting edges. The diameter of the bore of the tube is sufficiently large through the entire length thereof to accommodate the machine screw to be inserted therein without exerting stress upon the insert when thus introduced into the insert as such apart from its plastic mount. The bore includes a thread of diameter and pitch to fit those of such machine screw and extending at least throughout the major portion of the length of the insert. The crest of the external thread of the insert which also extends throughout the major portion of the length of the insert is of uniform diameter at that part of the insert length which is beyond the longitudinally interrupted or slotted portion and the crest of the external thread along at least part of the interrupted portion of the insert lies in a conical locus tapered to the interrupted extremity of the insert.

The insert is applied into the smooth cylindrical bore 17 machined or pre-molded in the low shearing strength mounting structure S of plastic, wood or metal. For this purpose, a suitable driving tool T, to be described below, may be employed.

The pilot 14 will center the insert 10 in the bore 17 of the structure S and the thread cutting edges 20, 19 will cause the insert to tap its way into the bore of the mounting structure. In this tapping operation, the thread is progressively cut as the sharp thread edges 20 of truncated contour at the entry end of the insert are progressively introduced, the unmutilated upper thread convolutions of the insert body smoothing out and polishing the outer region of the thread which the insert thus automatically taps into the originally smooth bore of the mounting structure. As the insert is driven home, its head 15 becomes bottomed in the countersink 16 at the face of the mounting structure. In this tapping operation, the chips cut from the plastic, wood or metal of the mounting structure remain confined in the slots 18 and in the socket 21 at the bottom of the insert mounting socket.

The tongues 22 defined between successive slots 18 at the inner portion of the insert, will have been forced inward as shown in exaggerated form in Fig. 2, by the reaction of the mounting structure with the mutilated thread beyond the inner extremities of slots 18, thereby substantially to clear the bore 17 at the inner extremity of the insert, and the originally parallel walls of the slots 18, as shown in Fig. 1, are thereby caused to converge toward the extremity, as best shown in Fig. 2.

Illustratively, six equidistant slots 18 are used on each insert, but a lesser or greater number is feasible and the slots may be of greater or lesser length depending on the yieldability or the degree of inward closing of tongues 22 that is desired. The thickness of the stock at the inner end of the insert, that is, the relative diameter of the inside and outside threads also determines the yieldability or degree of inward closing of the tongues 22.

Any of a variety of tools may be employed for introducing the insert into the mount. One such tool T is shown in Fig. 1. It comprises a handle 25 having on the extremity thereof a threaded stud 26, which meshes with the tapped or threaded bore 12 of the insert. Desirably, the handle end of the tool has a flat undersurface 27 of diameter no larger than the bore of the countersink 16. Accordingly, the tool may be threaded into the insert until its flat 27 engages the head 15. The insert is then guided by its pilot 14 into the bore 17 of the mounting structure until the head 15 bottoms in the countersink 16. At that time the thread of the insert will have gripped so tightly against the wall 17 of the mounting structure that the mounting tool may readily be unscrewed from the insert, without loosening the latter from the mounting structure and without injury of any kind.

Preferably the tool is provided with an unthreaded inlet or pilot stud extension 28 with only .002 to .003 inch clearance with respect to the peaks of the tapped threads 12, which correspondingly limits the amount of inward deflection permitted at the tongues 22 between the slots 18 of the insert. This feature is desirable in order to avoid too much binding of the screw to be introduced into the insert.

Upon introduction of a commercial machine screw 13 into the insert, as for instance, to lock a plate 29 upon the mounting structure, as shown in Fig. 3, the inner end of such screw will deflect or force the inwardly deflected tongues 22 outward to substantially the position of said tongues before introduction of the insert into the mount. Not only is the screw thereby caused securely to be anchored in the insert, but the outward deflection of the insert tongue ends 22 into the mounting structure results in locking such insert more effectively in place. It will be noted that the insert is thereby maintained securely in the mounting structure and the screw securely in the insert, without the need for any lock washers, lock nuts, lock rings or other auxiliary securing appliances.

It will be understood that the screw 13 may be readily removed from the insert, without injury to or loosening of the latter, which remains permanently in place. If desired, the insert could also be removed, especially if its head be provided with a suitable fillister slot (not shown) and will leave a smooth thread in the mounting structure in which may be securely accommodated a similar replacement insert, desirably of slightly larger diameter.

The self-tapping arrangement of insert described, while ordinarily preferred, is only one example of various types of self-tapping screws that could be adapted according to the present invention for use as hollow tapped inserts for plastic, wood and metal of relatively low tensile strength.

One illustrative example of an alternative self-tapping insert is shown in Fig. 4, which involves a construction generally similar in appearance to that of Fig. 1, except that the threads 30 in this instance are preferably rolled, as is also the series of self-tapping grooves 31 which extend transversely across the threads at high pitch at the inner part of the insert. The thread rolling operation may be performed in manner well understood by those skilled in the art.

Since the inner end of the insert of Fig. 4, unlike that of Fig. 1, is continuous and not slotted or interrupted into tongues, but is weakened along longitudinal grooves the inward deflecting action and outward forcing action of the screw 13 is not to be compared with the action of the embodiment of Fig. 1, but the construction of Fig. 4 is yet adequate for many applications, especially on structures generally that are not subject to intense or sustained vibration in use.

As many changes could be made in the above construction, and many apparently widely different embodiments of this invention could be made without departing from the scope of the claims, it is intended that all matter contained in the above description or shown in the accompanying drawings, shall be interpreted as illustrative and not in a limiting sense.

Having thus described my invention, what I claim as new and desire to secure by Letters Patent of the United States is:

1. An insert suitable for self tapping into an untapped cylindrical bore in a plastic mount and suitable for accommodating therein a machine screw having a thread of uniform diameter, cross section and pitch, said insert comprising an internally and externally threaded tube of metal having interruptions extending longitudinally from one end thereof, the sides of said interruptions determining cutting edges, the inside diameter of said tube throughout the entire length thereof being sufficiently large to accommodate such machine screw and said bore being threaded at least throughout the major portion thereof with a thread of diameter and pitch to fit that of such machine screw, said threaded portion extending from within the uninterrupted portion into the interrupted portion of said tube, the external thread of said tube being a machine thread of uniform root diameter extending along the major portion of the length of the insert, the crest of said external thread being of uniform diameter at that portion of the insert length which is beyond said interruptions, and the crest of said exterior thread along a portion of the length thereof which has the interruptions being in a conical locus tapering to the interrupted extremity of the insert, whereby upon threading the insert into such untapped bore the cutting edges at its entry and will form a corresponding thread in the plastic and the resistance of the mount will force said interrupted portion of the tube slightly inward, so that upon the subsequent introduction of a machine screw that fits into the insert said interrupted portion of the tube will be forced outward thereby to substantially its original form for enhanced grip of the insert in such mount and of such screw in the insert.

2. The combination of a plastic mount with the insert as claimed in claim 1 threaded in place therein, a portion of the insert length which has the interruptions being maintained inward slightly by the encompassing mount structure.

3. A mount of plastic having threaded in place therein the insert claimed in claim 1 and having threaded in place within said insert and along the length thereof, a machine screw, the said screw retaining the interrupted portion of the insert in substantially the original condition of said insert prior to the deformation incurred in introducing the same into the bore in said mount.

4. The combination recited in claim 1 in which the longitudinal interruptions are slots through the insert and the external machine screw thread is truncated along said conical locus.

ERICH G. THEURER.

REFERENCES CITED

The following references are of record in the file of this patent:

UNITED STATES PATENTS

| Number | Name | Date |
| --- | --- | --- |
| 1,168,770 | Wagner | Jan. 18, 1916 |
| 1,447,515 | Muller | Mar. 6, 1923 |
| 2,026,686 | Kerley | Jan. 7, 1936 |
| 2,278,411 | Braendel | Apr. 7, 1942 |
| 2,386,922 | Andrews | Oct. 16, 1945 |

FOREIGN PATENTS

| Number | Country | Date |
| --- | --- | --- |
| 19,218 | Great Britain | Mar. 25, 1915 |
| 466,039 | Great Britain | May 20, 1937 |